(12) United States Patent
Sofianos

(10) Patent No.: US 8,800,331 B1
(45) Date of Patent: Aug. 12, 2014

(54) BARRIER FOR PREVENTING TAMPERING WITH FUEL STORAGE TANKS

(71) Applicant: Alex Sofianos, Pembroke Pines, FL (US)

(72) Inventor: Alex Sofianos, Pembroke Pines, FL (US)

( * ) Notice: Subject to any disclaimer, the term of this patent is extended or adjusted under 35 U.S.C. 154(b) by 0 days.

(21) Appl. No.: 13/744,481

(22) Filed: Jan. 18, 2013

(51) Int. Cl.
*B65D 55/14* (2006.01)

(52) U.S. Cl.
USPC .................................. 70/164; 70/158; 70/177

(58) Field of Classification Search
USPC ......... 70/38 A, 158, 163, 166, 170, 175, 176, 70/177, 178, 180
See application file for complete search history.

(56) References Cited

U.S. PATENT DOCUMENTS

| | | | | |
|---|---|---|---|---|
| 1,832,057 A | * | 11/1931 | Stein | 70/164 |
| 1,944,535 A | * | 1/1934 | White | 70/164 |
| 1,989,300 A | * | 1/1935 | Webb | 70/164 |
| 2,526,238 A | * | 10/1950 | Kendall | 70/164 |
| 3,979,933 A | * | 9/1976 | Mohrhoff | 70/164 |
| 4,254,888 A | * | 3/1981 | Chandler | 70/164 |
| 4,428,395 A | * | 1/1984 | Bravo | 70/180 |
| 4,788,840 A | * | 12/1988 | Wilson, Jr. | 70/164 |
| 5,377,511 A | * | 1/1995 | Meckbach | 70/38 A |
| 5,467,621 A | | 11/1995 | Gravino | 70/171 |
| 5,884,509 A | * | 3/1999 | LeBoeuf | 70/164 |
| 6,692,045 B1 | | 2/2004 | Mc Call, Jr. | 292/281 |
| 8,240,500 B2 | | 8/2012 | Dalton, Jr. et al. | 220/327 |

* cited by examiner

*Primary Examiner* — Christopher Boswell
(74) *Attorney, Agent, or Firm* — Stein IP, LLC

(57) ABSTRACT

The invention relates to a mechanical barrier which prevents tampering with a filler pipe on an underground storage tank for gasoline, fuel, chemicals, or other valuable liquids. The barrier fits within a cylindrical metal liner that surrounds the filler pipe. The barrier includes two spaced posts with semi-circular brackets at their lower ends, for securement about the filler pipe. An annular plate is secured between the upper ends of the post. A lock fits into a cut-out in the plate. A plunger within the lock is extended through an opening at the upper end of one post to maintain the barrier in locked position around the filler pipe, to prevent unauthorized withdrawal of or tampering with the contents of the tank.

6 Claims, 4 Drawing Sheets

BARRIER FOR PREVENTING TAMPERING WITH FUEL STORAGE TANKS

BACKGROUND OF THE INVENTION

1. Field of the Invention

The present invention pertains to a mechanical barrier which prevents tampering with storage tanks for fuels and other valuable liquids.

2. Description of the Related Art

U.S. Pat. No. 6,692,045, McCall, shows one of many approaches adopted to prevent tampering with the fill pipe, or stem, of an underground tank. FIG. 3 of McCall shows a cap (74) that is secured to the upper end of a stem (72). The retrofittable cap locking assembly, including a base portion (12), and a cover portion including a plate (18) and a flange (26), is fitted about the stem. A lock (40) passes through ears, or annular members (36, 38), to secure the cap locking mechanism in a fixed position around the cap (74).

U.S. Pat. No. 5,467,621, Gravino, discloses a closure (10) including a base (13) adapted to be screwed into a fuel tank filler pipe, and having a fill opening (18), normally closed by a hinged flapper valve (20), which is opened when a fuel nozzle is inserted into the fill opening. The base is shielded against being manually gripped and unscrewed from the filler pipe by a cover (30) also having a fill opening (34) and normally supported for free rotation on the base, so that turning of the cover is normally ineffective to unscrew the base.

Another approach to preventing tampering with filler pipes for storage tanks is disclosed in U.S. Pat. No. 8,240,500, Dalton et al. Dalton et al. discloses a lockable blocking plate (1) that is secured to a filler cap (3) for an underground storage tank. The locking mechanism is configured such that the lock (2) and the blocking plate may freely rotate with respect to the filler cap.

Numerous other approaches have been devised to prevent tampering with fuel storage tanks, which may contain gasoline, diesel fuel, oil, chemicals, or other valuable liquids. However, no one approach or structure has proven to be impenetrable to determined thieves armed with lock picking equipment, bolt cutters, pry bars, torches, and the like. Thus, the need for a relatively simple device of modest cost, which is easy to install and maintain, yet deters and/or defeats attempts to steal or tamper with the contents of underground tanks, remains unsatisfied.

SUMMARY OF THE INVENTION

While not limited thereto, an embodiment of the invention is directed to a mechanical barrier that is readily retrofitted about a filler pipe, or upwardly extending stem, for an underground tank. The mechanical barrier fits within a cylindrical metal liner, disposed within a concrete block that encases two spaced posts with semi-circular brackets at their lower ends, for securement about the filler pipe. An annular plate is secured between the upper end of the posts, and a lock is operatively associated with the annular plate. A plunger in the lock is extended by a key, through an opening in one post, to maintain the barrier in locked position around the filler pipe.

A semi-circular cut-out is formed in the annular plate. The lock is cylindrical in shape, and a depending step is formed on its lower surface. The step fits snugly into the cut-out, so that the lock cannot be dislodged by a pry bar, and the barrier remains securely locked in fixed position.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
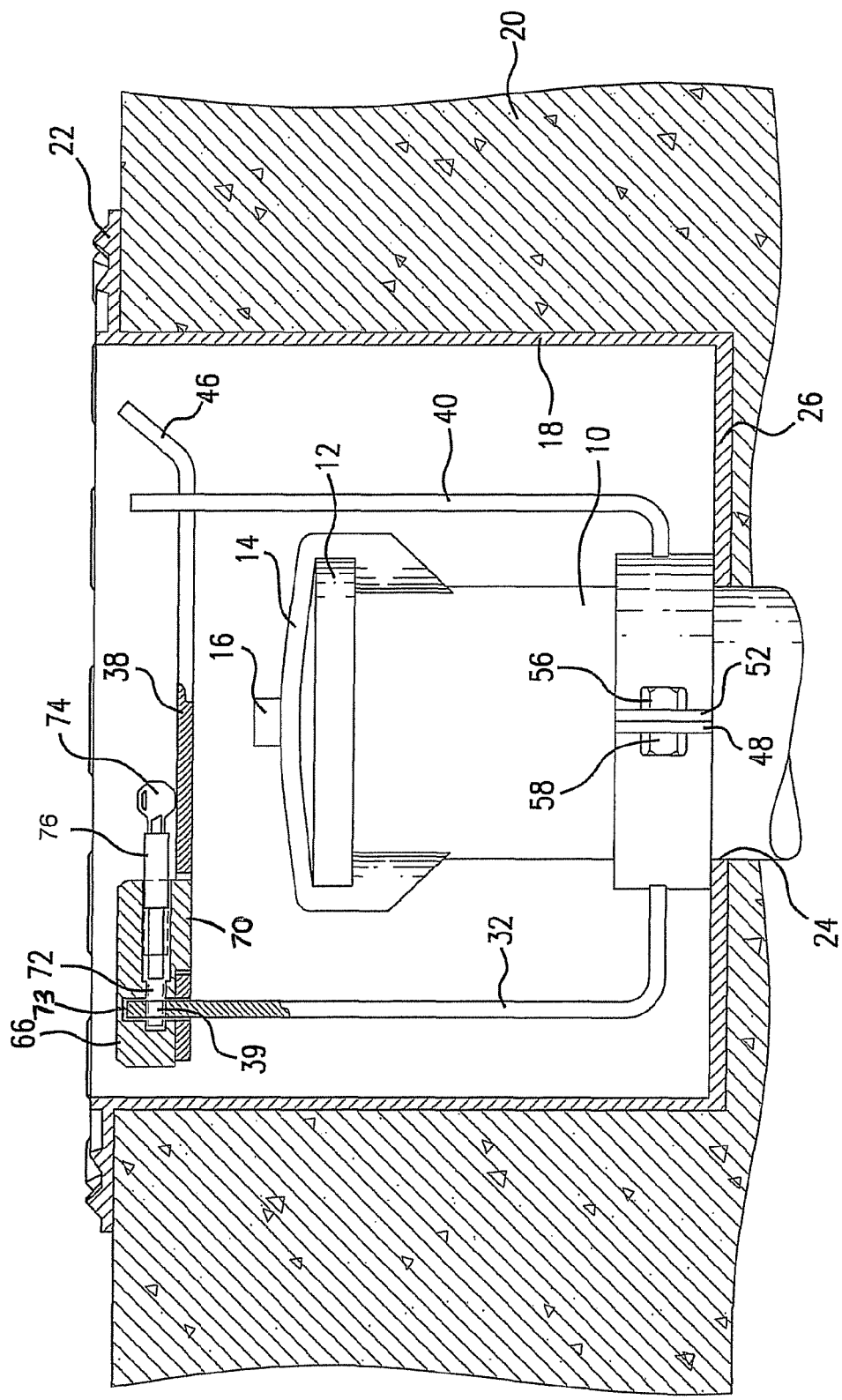
FIG. 1 is a vertical cross-sectional view of a barrier, constructed in accordance with an embodiment of the present invention, installed upon a filler pipe.

Reference will now be made in detail to the present embodiment of the instant invention, an example of which is illustrated in the accompanying drawings, wherein like reference numerals refer to the like elements throughout. The embodiment is described below in order to explain the present invention by referring to the figures.

FIG. 1 shows a filler pipe 10 that provides access to an underground storage tank (not shown), which retains gasoline or other valuable liquids. In, for example, a conventional gas station, the storage tank may supply several gasoline dispensers, located at ground level, to service vehicles driven into the station for such purpose. End cap 12 seals the upper end of filler pipe 10, and a protective overcap 14 fits over the end cap. Lock 16 retains the overcap in fixed position, until an authorized worker at the facility unlocks the overcap.

A cylindrical metal liner 18 is embedded in concrete block 20 and surrounds filler pipe 10. Flange 22 encircles the upper end of liner 18, and filler pipe 10 extends downwardly through aperture 24 in floor 26 toward an underground storage tank (not shown).

Figure 2:
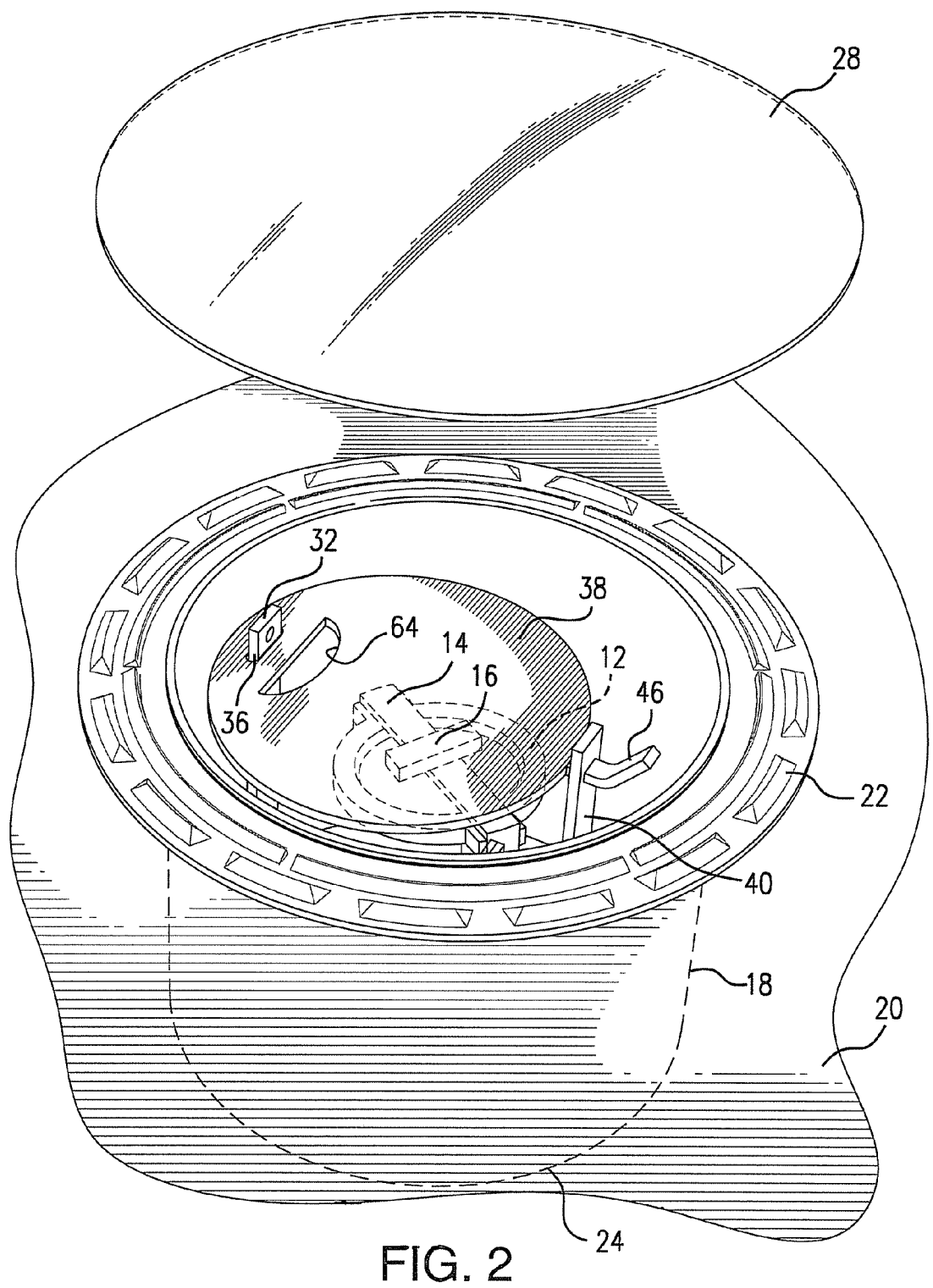
FIG. 2 is an perspective view of the barrier of FIG. 1.

FIG. 2 shows cover 28, which normally fits over flange 22 of liner 18, and shields filler pipe 10 from view, according to the present invention. Cover 28 may be seated in a loose fashion upon flange 22 or, alternatively, may cooperate with grooves or ribs on flange 22 to lock in a fixed position.

Figure 3:
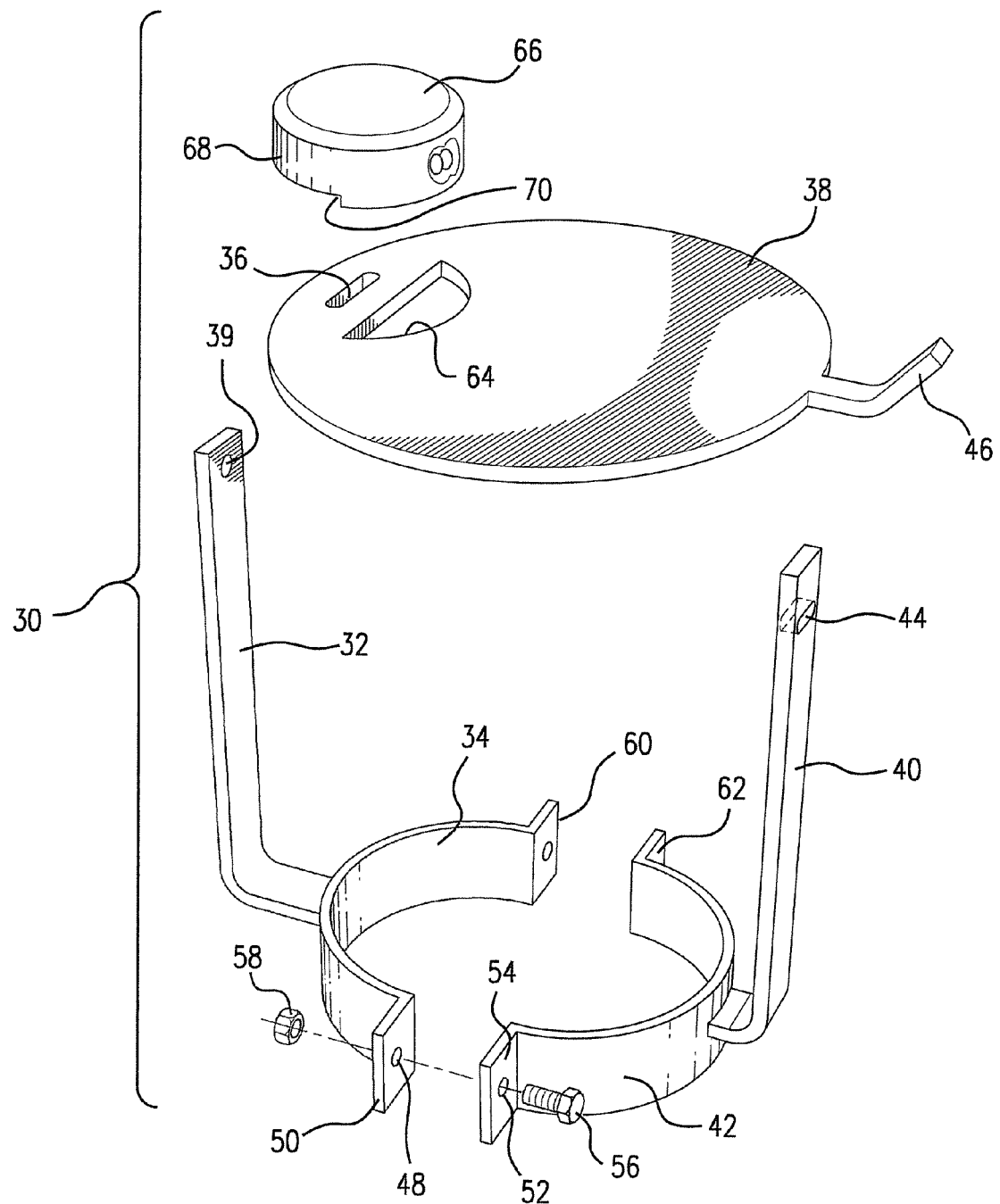
FIG. 3 is an exploded perspective view of the barrier of FIG. 1.

FIG. 3 depicts the components of unique barrier 30 for preventing tampering with filler pipe 10. Barrier 30 includes a first L-shaped post 32 with a semi-circular bracket 34 at its lower end. The upper end of post 32 projects through rectangular opening 36 in protective plate 38, and an aperture 39 extends through the upper end of post 32.

Barrier 30 further includes a second L-shaped post 40, with a semi-circular bracket 42 at its lower end. An aperture 44 extends through the upper end of post 40, and tab 46 on protective plate 38 passes through aperture 44. Posts 32, 40 are located on diametrically opposite sides of barrier 30.

Opening 48 is formed in ear 50 on bracket 34, and opening 52 is formed in ear 54 on bracket 42. Openings 48, 52 are aligned, and the ears are drawn together through the cooperation of bolt 56 and nut 58. Ears 60, 62, on the opposite ends of brackets 34, 42, may also be drawn together by a cooperating nut and bolt in corresponding openings (not shown).

Figure 4A:
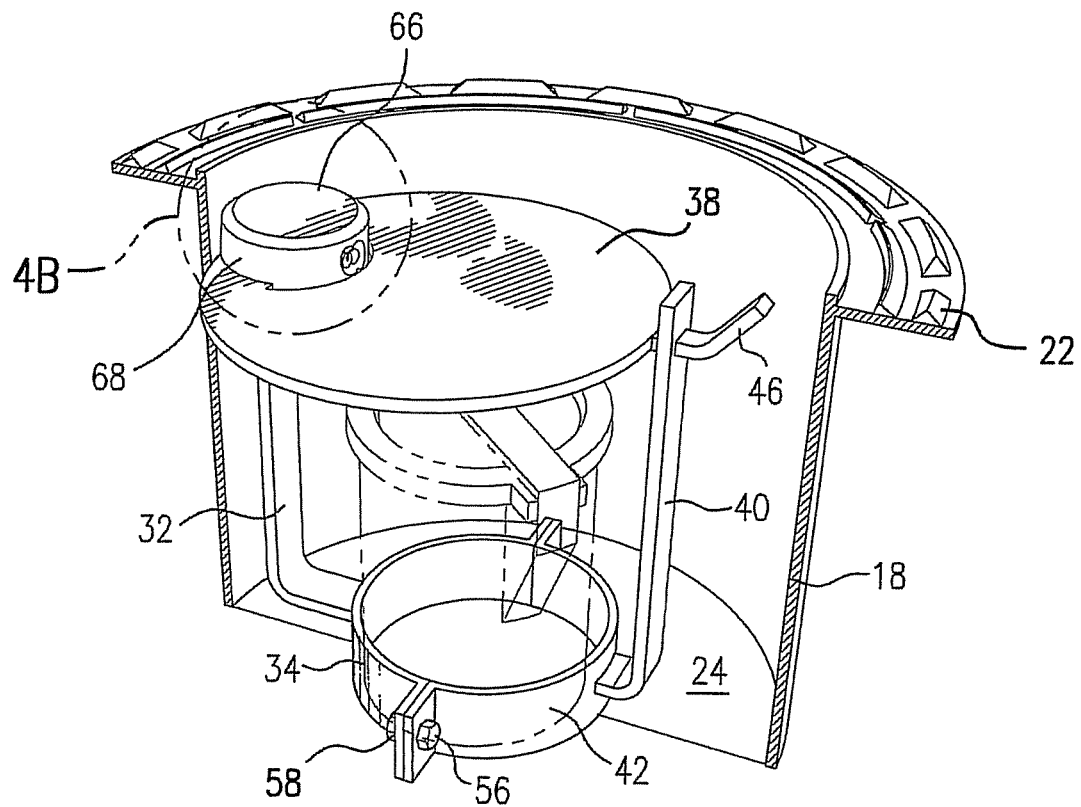
FIG. 4A is a perspective view of the barrier of FIG. 1, located within a liner surrounding the filler pipe.

The brackets, after being drawn together, encircle filler pipe 10 and rest upon floor 26 of liner 18, as shown in FIGS. 1 and 4A.

A vertically extending channel 73, defined within body 68 of lock 66, receives the upper end of post 32. The lock is retained in fixed position on the upper face of protective 38, as shown in FIGS. 1 and 4B.

A semi-circular cut-out 64 extends through protection plate 38 in proximity to opening 36. Lock 66, another component of barrier 30, includes a cylindrical body 68 with a depending step 70, which extends beneath one half of body 68. Plunger 72 is extended axially through aperture 39 in post 32 when key 74 is inserted into sleeve 76 and rotated, as shown in FIG. 1.

FIG. 4A illustrates the spatial relationship of barrier 30 to liner 18. The liner has been divided along a vertical plane passing through its center to reveal the exterior of the liner. The vertical location of protective plate 38 below flange 22 is shown, as is the relationship of brackets 34, 42 to floor 26 at the lower end of liner 18.

Figure 4B:
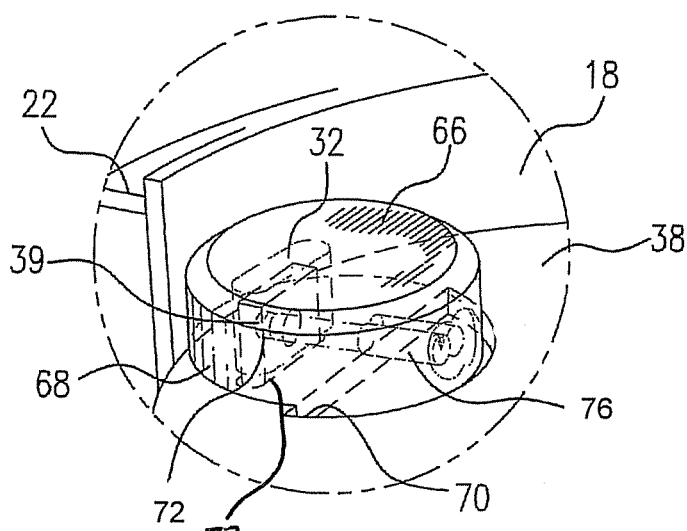
FIG. 4B is a perspective view of a lock employed within the barrier of FIG. 1, such view being taken within insert 4B in FIG. 4A, and on an enlarged scale.

FIG. 4B shows the manner in which step 70 on lock 66 fits snugly into semi-circular cut-out 64 on plate 38. The lock is thus secured to the plate without any exposed surfaces that might serve as fulcrum for a thief or saboteur to pry the lock from the plate and gain access to filler pipe 10. Plunger 72 is located within body 68 of lock 66. When key 74 is turned, by the facility owner or other authorized personnel, the plunger is extended or retracted. The plunger passes through aperture 39 in post 32, shown in FIG. 1, in its extended, or locked, position.

When plunger 72 is withdrawn from opening 39 in post 32, annular plate 38 may be tilted or pivoted upwardly about tab 46. Annular plate 38 is thereby removed from its blocking position, and access is gained filler pipe 10 and the underlying underground tank.

Other modifications and revisions to Applicant's device will become readily apparent to one skilled in the pertinent areas of technology, without departing from the spirit of Applicant's device. For example, while barrier 30 is described with reference to a filler pipe for an underground tank, such barrier might also be utilized on a tank situated above ground, or on a tanker vessel or tanker truck. Consequently, the appended claims should not be limited to their literal terms, but should be construed in a manner consistent with Applicant's contribution to science and the useful arts.

PARTS LIST

10 Filler pipe
12 End cap
14 Protective overcap
16 Overcap lock
18 Metal liner
20 Concrete block
22 Flange
24 Aperture (in floor 26)
26 Floor (of liner 18)
28 Cover
30 Barrier (generally)
32 L-shaped post (first)
34 Semi-circular bracket (in post 32)
36 Opening (in plate 38)
38 Annular plate
39 Aperture (in post 32)
40 L-shaped post (second)
42 Semi-circular bracket (in post 40)
44 Aperture (in post 40)
46 Tab (on plate 38)
48 Opening (in ear 50)
50 Ear (on bracket 34)
52 Opening (in ear 54)
54 Ear (on bracket 42)
56 Bolt
58 Nut
60, 62 Ears (on opposite sides of brackets 34, 42 from ears 50, 54)
64 Semi-circular cut-out (in plate 38)
66 Lock
68 Body (of lock 66)
70 Step (on lock 66)
72 Plunger
74 Key (for lock 66)

What is claimed is:

1. A barrier which prevents tampering with a filler pipe of a tank, said barrier comprising:
   (a) a first upstanding post;
   (b) a second upstanding post spaced away from said first post;
   (c) a first bracket located at the lower end of said first post, and a second bracket located at the lower end of said second post;
   (d) fasteners configured to secure said brackets together to define a circular opening adapted to encircle a filler pipe;
   (e) an opening formed in the upper end of said first post;
   (f) an aperture formed in the upper end of said second post;
   (g) an annular plate spanning the distance between the upper ends of said first and second posts;
   (h) a tab projecting outwardly from said annular plate and passing through said aperture at the upper end of said second post;
   (i) a slot formed in said annular plate;
   (j) a lock located on said annular plate, said lock including a body;
   k) a cavity formed in the body of said lock; and
   l) the upper end of said first post passing through said slot and into said cavity in said lock for retaining said lock on said annular plate.

2. The barrier as defined in claim 1, wherein:
   a semi-circular cut-out is formed in said annular plate, and said body of said lock being cylindrical in shape with a depending step, said depending step fitting snugly into said cut-out in said annular plate.

3. The barrier as defined in claim 2, wherein said lock further comprises:
   a plunger that can be extended from said cylindrical body, and
   a key, which when turned, shifts said plunger outwardly, and locks said annular plate in blocking position relative to the filler pipe.

4. The barrier as defined in claim 3, wherein said plunger is shifted in a horizontal direction to pass through said opening formed at the upper end of said first post and secure said annular plate between said first and second posts.

5. The barrier as defined in claim 1 wherein said tab on said annular plate is angled upwardly so that said annular plate can be pivoted relative to said second post.

6. The barrier as defined in claim 1 wherein said cavity in said lock is an upwardly extending channel.

* * * * *